May 31, 1938.  A. PRANGER  2,119,244

STUFFING BOX

Filed June 4, 1936

Inventor
ALBERT PRANGER
By
Attorney

Patented May 31, 1938

2,119,244

UNITED STATES PATENT OFFICE 2,119,244

STUFFING BOX

Albert Pranger, Dallas, Tex., assignor to The Guiberson Corporation, Dallas, Tex., a corporation of Delaware Application June 4, 1936, Serial No. 83,527

10 Claims. (Cl. 286—15)

This invention relates to new and useful improvements in stuffing boxes.

One object of the invention is to provide an improved stuffing box for packing off around a reciprocating rod, such as the "polish" rod of an oil well.

An important object of the invention is to provide an improved stuffing box wherein the packing assembly through which the rod extends is so arranged as to compensate for any deviation of the rod from a vertical line, whereby the packing seal is maintained at all times, and undue wear on the device is eliminated.

Another object of the invention is to provide an improved stuffing box wherein the packing assembly is mounted to undergo a rocking or lateral movement within the housing, whereby a deviation from the vertical of the rod extending through the packing will move the assembly therewith and thus, the elastic packing within the assembly remains in contact with the rod at all times and maintains its seal, regardless of the position of the rod.

A further object of the invention is to provide an improved stuffing box which includes elastic packing which is retained in the housing by a gland, the gland being constructed so as to guide the lateral or rocking movement of the packing assembly, whereby said gland serves a dual purpose and greatly simplifies the structure.

A still further object of the invention is to provide an improved stuffing box for the polish rod of an oil well which is so arranged that the rod, as well as the other pumping equipment may be removed from the well without removing the body of the box from the tubing.

Still another object of the invention is to provide an improved stuffing box for a reciprocating rod of an oil well, the box being so constructed that the packing of the box may be replaced under pressure.

A construction designed to carry out the invention will be hereinafter described, together with other features of the invention.

Figure 1:
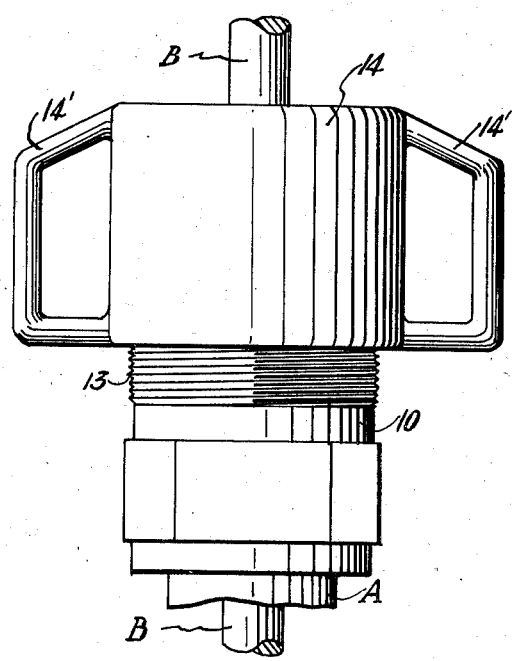
Figure 2:
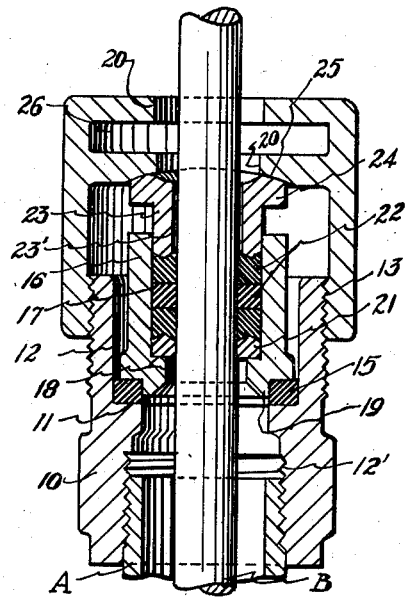
Figure 3:
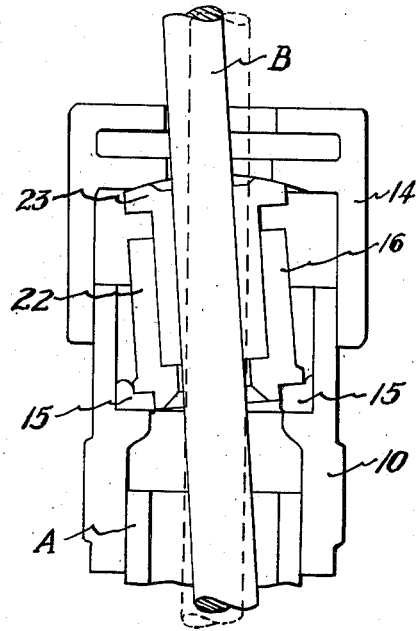
Figure 4:
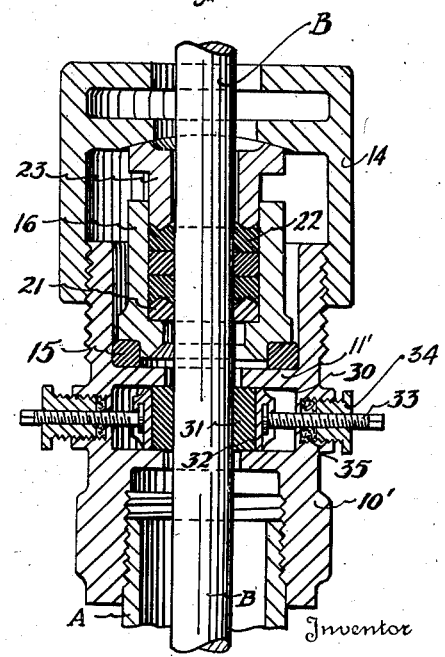

The invention will be more readily understood from a reading of the following specification and by reference to the accompanying drawing, in which an example of the invention is shown, and wherein:

Figure 1 is an elevation of a stuffing box constructed in accordance with the invention, Figure 2 is a transverse, vertical sectional view of the same, Figure 3 is a diagrammatical view showing the rod passing through the stuffing box in a position off of a vertical line and also showing the movement of the packing assembly of the stuffing box with the rod, and Figure 4 is a view similar to Figure 2 and showing a blow-out preventer mounted below the packing assembly of the box, whereby the packing of the box may be replaced under pressure.

In the drawing, the numeral 10 designates an annular base which is provided with an internal annular seat 11 at approximately mid-height thereof. The bore 12 of the housing above the annular seat 11 is larger than the portion of the bore 12' below said seat. The bore 12' of the base is internally screw-threaded as is clearly shown in Figure 2, whereby the base may be readily mounted on the upper end of the well tubing A, or other support. The upper end of the base is externally threaded at 13 whereby a flanged head 14 may be screwed onto the base. The head is provided with suitable handles 14' which are located diametrically opposite each other and extend radially from the side of the head.

A flexible ring 15, which may be constructed of rubber, rubber compound, "Duprene", or other suitable material rests upon the internal annular shoulder or seat 11 which is formed within the base 10. A packing housing 16 has its lower end resting upon the flexible ring, whereby said housing is supported within the upper end of the base 10. The exterior diameter of the housing 16 is smaller than the inner diameter of the upper end 12 of the bore of the base, whereby an annular space is provided between the housing and base. The housing is formed with an axial bore 17 which bore is reduced at its lower end to form an internal annular shoulder 18 within the housing. An annular lip or flange 19 depends from the housing 16 and this lip surrounds the lower end of the bore of said housing and is adapted to engage within the ring 15, whereby the housing is held in position on said ring.

The reciprocating rod B extends downwardly through an axial opening 20 formed in the head 14 and downwardly through the bore 17 of the packing housing 16 and also through the base 10 and into the tubing A. It is noted that the bore of the base, as well as the reduced portion of the bore of the housing 16, have a greater diameter than the exterior diameter of the rod B, whereby said rod may move laterally within the packing housing and within the base. For packing off around the rod B, a metallic packing supporting ring 21 surrounds the rod B and is supported upon the internal shoulder 18 which is formed near the lower end of the packing housing 16. A plurality of elastic packing rings 22 rest upon the metallic ring 21 and surround the rod B, being confined within the housing 16. It is noted that the packing rings 22 are of such size that their inner peripheries snugly engage the outer surface of the rod B.

For retaining the packing rings in position within the housing and in intimate contact with the outer surface of the rod B, a packing gland 23 has its lower end engaged within the upper end of the bore of the housing 16. The packing gland is provided with an axial bore 23' through which the rod B extends. An annular flange 24 is preferably formed integral with the upper end of the packing gland and this flange overhangs the upper end of the housing 16. The upper surface of the packing gland 23 is arcuate or curved as is clearly shown in Figure 2. The underside of the top of the head 14 is provided with a complementary curved surface 25, whereby when the head 14 is screwed onto the base 10, the surface 25 engages the curved top of the gland 23 to hold the gland within the housing 16. With such arrangement, it will be obvious that the head 14, when tightened down upon the base 10, will serve to retain the packing gland 23 in position, whereby the packing rings 22 are compressed and held in engagement with the rod B. As the packing wears it will be obvious that it is only necessary to tighten the head 14 further on the base, which will force the gland 23 downwardly within the housing to further compress the packing rings 22. The head 14 may, if desired, be provided with a suitable oil reservoir 26 in its upper end, whereby a suitable lubricant is at all times applied to the exterior surface of the vertically reciprocating rod B.

It has been found in actual practice, that the reciprocating polish rod of an oil well will during its vertical reciprocation, deviate from a true vertical line. This wobbling or lateral movement of the rod will, of course, cause undue wear on the packing rings 22 and the other parts of the stuffing box, unless some provision is made for compensating for such wear. The particular mounting of the packing housing 16 as shown in the drawing, will permit the wobbling of the polish rod during its vertical movement, without breaking the seal formed by the packing rings 22 and also without causing undue wear on the other parts.

In using the device, it will be seen that the parts are assembled as shown in Figure 2 with the packing rings 22 snugly engaging the exterior of the rod B. As the rod reciprocates vertically, it will be obvious that it slides through the packing ring and thus a seal is maintained during the vertical reciprocation of the rod. However, if the rod should deviate from a true vertical line and thereby wobble or move laterally within the base 10, housing 16 and head 14, it will be obvious that due to the mounting of the packing housing 16, said housing will be moved laterally with the rod. The wobbling of the rod B will cause the packing housing 16 to tilt as is shown in Figure 3 and the guiding of the movement of the housing during such tilting, is accomplished through the curved surface of the packing gland 23 riding against the arcuate surface 25 within the head 14. Since the housing 16 is supported upon the flexible ring 15, it will be obvious that the flexible ring will readily permit the tilting of the housing. Therefore, the packing rings 22 carried within the housing 16 remain in contact at all times with the rod B and, therefore, regardless of the lateral movement or wobbling of said rod, the packing seal is maintained. The packing gland 23, not only serves to hold the packing rings 22 within the housing 16, but its curved upper surface serves to guide the housing 16 during its tilting or lateral movement within the base 10. As has been stated, whenever the packing rings 22 wear, it is only necessary to further tighten the head 14 on the base 10 whereby the gland is moved further into the housing 16.

The simplicity of the invention is a particular feature thereof, because the entire device may be readily assembled or disassembled in a very short time. By removing the head 14 from the base 10 it is possible to readily remove the packing gland 23 from the upper end of the housing, whereby the packing rings 22 may be readily removed. If desired, the entire housing 16 may be raised from the seat within the base 10. When it is desired to withdraw the rod B from the well tubing it is obvious that said rod may be pulled upwardly through the base 10 after the cap 14 and packing housing 16 have been removed. The bore of the base 10 is sufficiently large to permit the removal of the pumping equipment carried by the lower end of the rod B through the base without removing said base from the tubing A. It is pointed out that the packing housing 16 together with the packing rings and gland 23 are a single unit and may be removed or replaced in the base 10 bodily.

In some cases, it might be desirable to repack the housing 16 with new packing rings 22 after the previous packing rings have become worn, under pressure. In such case, a structure such as is shown in Figure 4 would be found adaptable. In this form a lower packing chamber 30 is provided in the base 10' below the seat 11' on which the flexible ring 15 rests. A split elastic packing member 31 is slidable laterally within the chamber 30, and this member is formed of two halves each of which are semi-circular in cross-section. For moving each section of the packing member 31 into engagement with the reciprocating rod B extending through the device, each section is provided with a follow block 32 which block is fastened to an adjusting screw 33. The screw 33 is threaded through the gland 34 of a packing device 35 which is located in the wall of the base 10'. It will be obvious by observing Figure 4 that by rotating the screw 33 the section of the packing member 31 may be moved inwardly towards or outwardly away from the reciprocating rod B.

Ordinarily, the packing member 31 is retracted in the chamber 30 so that the member is not in engagement with the rod B. However, when it is desired to repack the housing 16 under pressure, it is only necessary to rotate the adjusting screws 33, whereby the packing members 31 are moved into engagement with the rod B. The packing member engaging said rod will, of course, form a fluid-tight seal, whereby it is possible to remove the packing rings 22 from the housing 16 and replace the same with new rings, without any loss of pressure. It is noted that it is entirely optional whether or not the packing members 31 which permit repacking the housing 16 under pressure, is used.

In the claims whenever the word "head" is used it is intended to mean the parts rigidly secured to the tubing, such as the head 14 or the head 14 and the base 10.

What I claim and desire to secure by Letters Patent, is:

1. A stuffing box including, a head through which a reciprocating rod extends, a housing within the head and mounted to undergo a rocking movement relative to the head, an elastic packing within the housing and engaging the rod to pack off therearound, and a packing gland, said gland being held in engagement with said packing by means of said head.

2. A stuffing box including, a head through which a reciprocating rod extends, a housing mounted within the head and adapted to undergo a tilting movement relative to the head, elastic packing within the housing and engaging the rod to pack off therearound, means for guiding the housing in its movement, and a packing gland engaging said head and packing.

3. A stuffing box including, a head through which a reciprocating element extends, a housing mounted to undergo a tilting movement within the head, elastic packing within the housing and engaging said element, means for retaining said packing in the housing, and means co-acting with the last named means for guiding the housing in its movement within the head.

4. A stuffing box for a reciprocating element including, a head having an arcuate retaining surface through which the element extends, a housing mounted to undergo a tilting movement within said head, elastic packing within the housing and engaging the reciprocating element, and a packing gland having an arcuate surface contacting said arcuate surface of the head for retaining the housing within said head, said packing gland engaging the packing and being held in engagement therewith by said head.

5. A stuffing box for a reciprocating element including, a head through which the element extends, a housing mounted to undergo a tilting movement within said head, elastic packing within the housing and engaging the reciprocating element, means within the upper end of the housing for retaining the packing within the housing, and a closure secured to the head and co-acting with the retaining means for guiding the housing in its movement.

6. A stuffing box including, an annular head having an internal shoulder therein, a flexible ring on said shoulder, a housing wholly within said head having an axial bore, said housing being mounted on said ring whereby the housing may tilt within the head, a rod extending vertically through the housing and head, an elastic packing within the housing and engaging the rod, and a packing gland, said gland being held in engagement with said packing by said head.

7. A stuffing box including, an annular head having an internal shoulder therein, a flexible ring on said shoulder, a housing wholly within said head and having an axial bore, said housing being mounted on said ring whereby the housing may tilt within the head, a rod extending vertically through the housing and head, elastic packing within the housing and engaging the rod, and a packing gland held in packing position by said head and within the upper end of the housing for retaining the packing within the housing.

8. A stuffing box including, an annular head having an internal shoulder therein, a flexible ring on said shoulder, a housing having an axial bore mounted on said ring whereby the housing may tilt within the head, a rod extending vertically through the housing and head, elastic packing within the housing and engaging the rod, a packing gland within the upper end of the housing for retaining the packing within the housing, and means forming a part of the head and co-acting with the packing gland to guide the housing in its movement.

9. A stuffing box including, an annular head having an internal shoulder therein, a flexible ring on said shoulder, a housing having an axial bore mounted on said ring whereby the housing may tilt within the head, a rod extending vertically through the housing and head, elastic packing within the housing and engaging the rod, a packing gland within the upper end of the housing for retaining the packing within the housing, and a flanged member forming a part of the head and engaging the packing gland to hold the same within the housing, the member and gland co-acting to guide the housing in its tilting movement.

10. A stuffing box including, an annular head having an internal shoulder therein, a flexible ring on said shoulder, a housing having an axial bore mounted on said ring whereby the housing may tilt within the head, a rod extending vertically through the housing and head, elastic packing within the housing and engaging the rod, a packing gland within the upper end of the housing for retaining the packing within the housing, the packing gland having a curved top, and a flanged member forming part of the head and having the underside thereof curved to engage the curved top of the gland, whereby the head holds the gland in position within the housing and also co-acts therewith to guide the housing in its tilting movement.

ALBERT PRANGER.